July 24, 1923.
J. J. EYRE
TIRE CHAIN CARRIER
Filed April 21, 1921
1,462,789
5 Sheets-Sheet 1
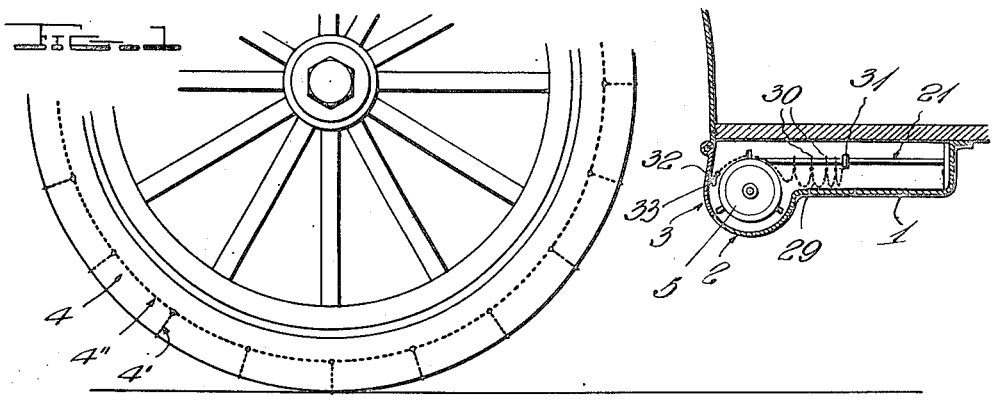
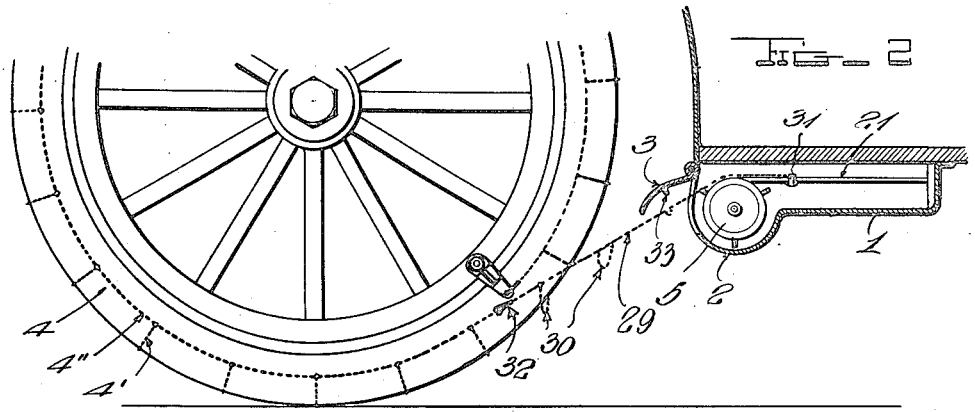
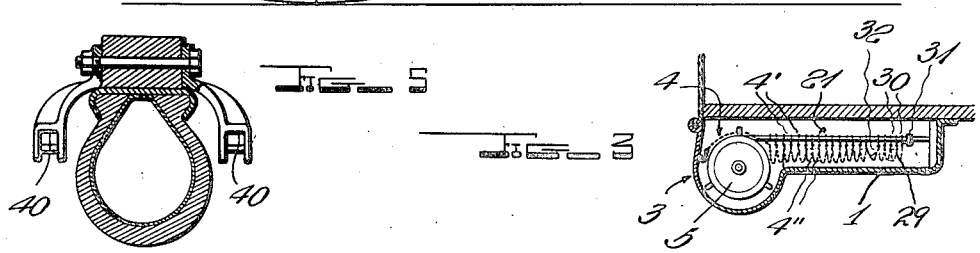
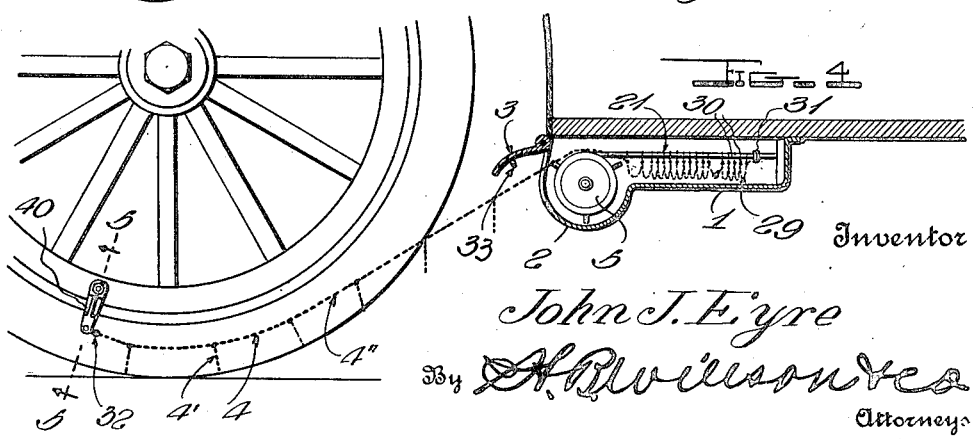
Inventor
John J. Eyre
By H. R. Willson &co.
Attorneys

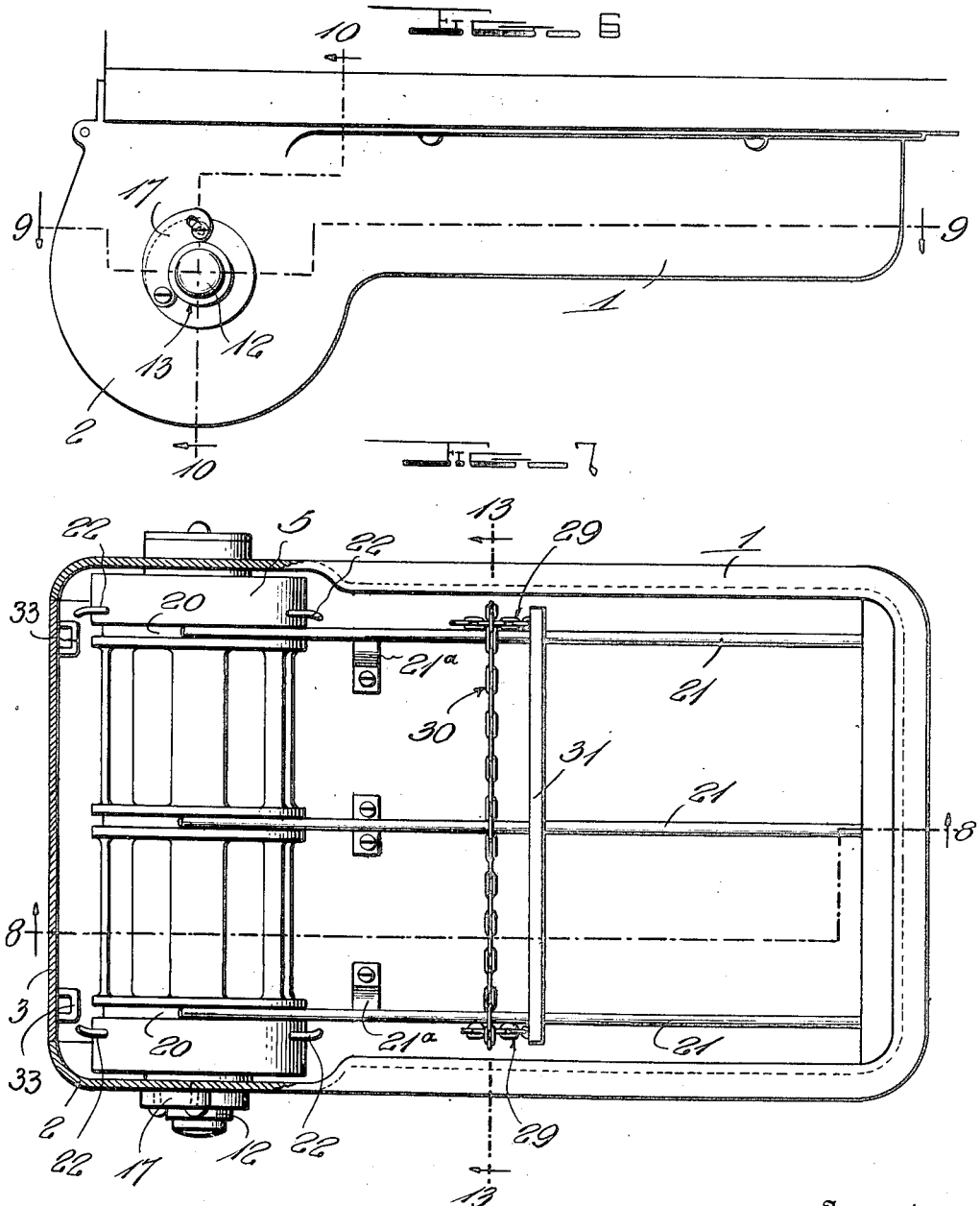

July 24, 1923.

J. J. EYRE 1,462,789

TIRE CHAIN CARRIER

Filed April 21, 1921

Inventor
John J. Eyre
By H. B. Wilson & Co.
Attorneys

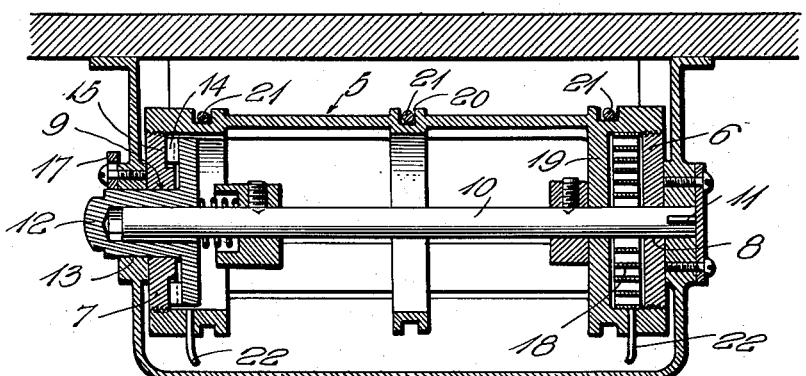
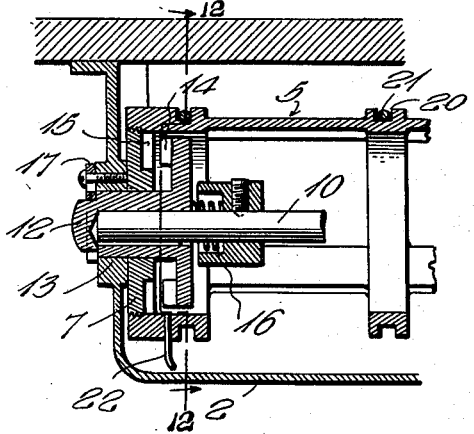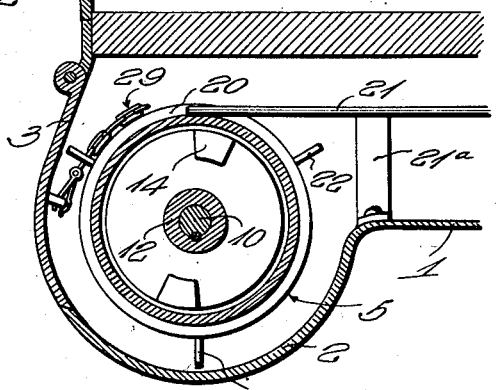
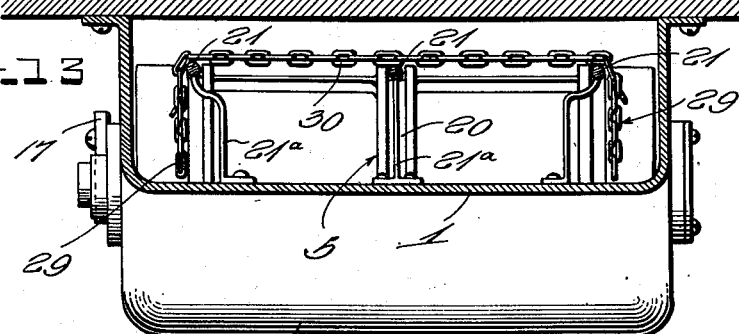

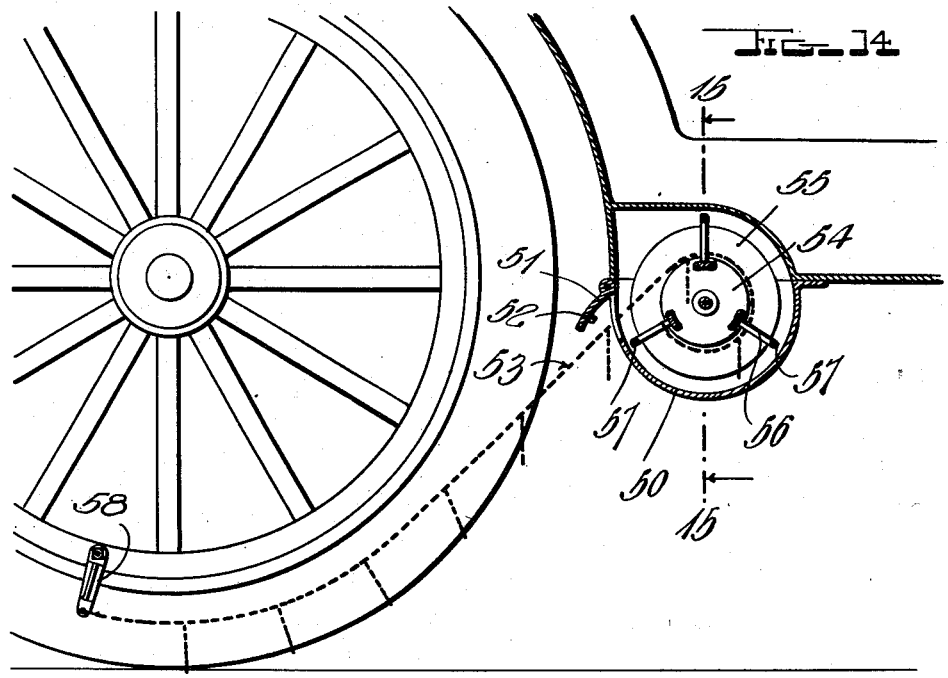
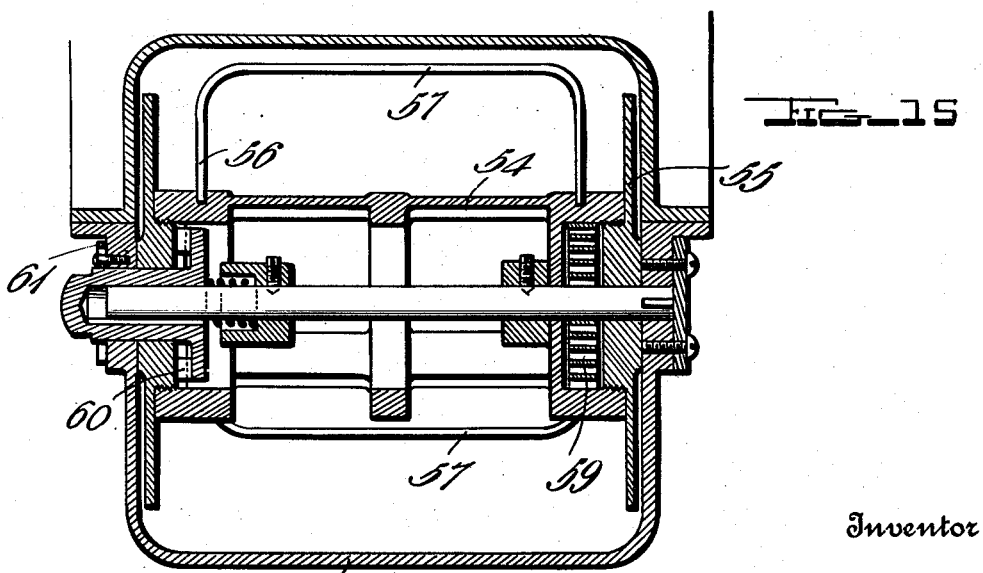

Patented July 24, 1923.

1,462,789

UNITED STATES PATENT OFFICE.

JOHN J. EYRE, OF SOMERVILLE, MASSACHUSETTS.

TIRE-CHAIN CARRIER.

Application filed April 21, 1921. Serial No. 463,139.

*To all whom it may concern:*

Be it known that I, JOHN J. EYRE, a citizen of the United States, residing at Somerville, in the county of Middlesex and State of Massachusetts, have invented certain new and useful Improvements in Tire-Chain Carriers; and I do declare the following to be a full, clear, and exact description of the invention, such as will enable others skilled in the art to which it appertains to make and use the same.

My invention relates to the control of anti-skid attachments for automobiles, and in a simple form, consists essentially of a retaining casing suitably mounted on a vehicle for the purpose of carrying anti-skid chains in compact form, and means within the casing for automatically taking up and carrying chains into the casing while the chain is being removed from the wheels of the vehicle. The retaining casing is adapted for mounting on the vehicle, adjacent to a wheel thereof, and in such relation to the latter that the anti-skid member may be instantly transferred from said retaining casing to the periphery of the wheel when the vehicle is put in motion or the wheel is revolved. The preferred location for the retaining casing is on the underside of the running board as shown in Figs. 1 and 2. It may, however, be attached to the vehicle elsewhere if found desirable.

One purpose of my invention is to provide a new and useful improvement in anti-skid attachments for automobiles which provides a suitable casing for the carrying of anti-skid chains in compact and convenient form, that will enable the operator of the machine to readily and quickly apply anti-skid chains to the periphery of the wheels to prevent skidding or slipping of the same on smooth or slippery surfaces, thereby avoiding accidents and possible injuries to passengers, machines, and pedestrians.

A further object of my invention is to provide means to readily and quickly remove the anti-skid member from the wheel and automatically return the same to its retaining casing, where it is again ready for emergency use, thereby doing away with the inconvenience and delay caused by present methods.

A still further object of my invention is to provide means whereby when an automobile is stalled by reason of slippery surface on a grade, snow drifts or on account of the rear wheels dropping into deep depressions in the road bed, the ends of the anti-skid chains can be readily secured to the wheels and carried around the same by the starting of the motive power, producing greater traction to the wheels and thereby overcoming obstacles.

With the foregoing and minor objects in view, the invention resides in the novel construction, combination and arrangement of parts, hereinafter described and claimed, the descriptive matter being supplemented by the accompanying drawings.

Figure 1 is a sectional view with parts in elevation showing the relation of parts when a tire chain is completely on the wheel.

Figure 2 is a view similar to Fig. 1 but showing the manner of removing the tire chain and positioning the same in the casing.

Figure 3 is a sectional view showing the chain completely confined within the casing.

Figure 4 is a view similar to Fig. 2 but illustrating the manner of applying a chain to the wheel.

Figure 5 is a detail sectional view on line 5—5 of Fig. 4.

Figures 6 and 7 are respectively side elevation and top plan views, the latter being partly in section.

Figure 8:
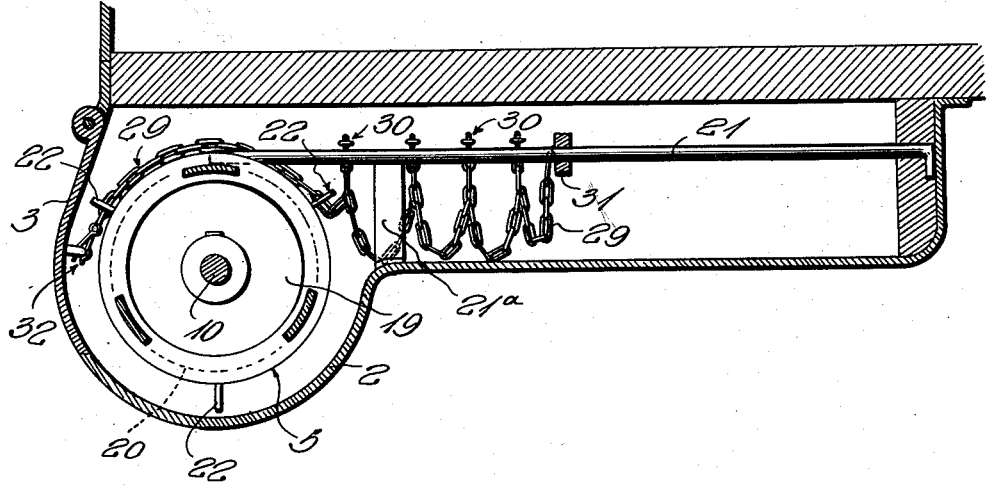
Figure 9:
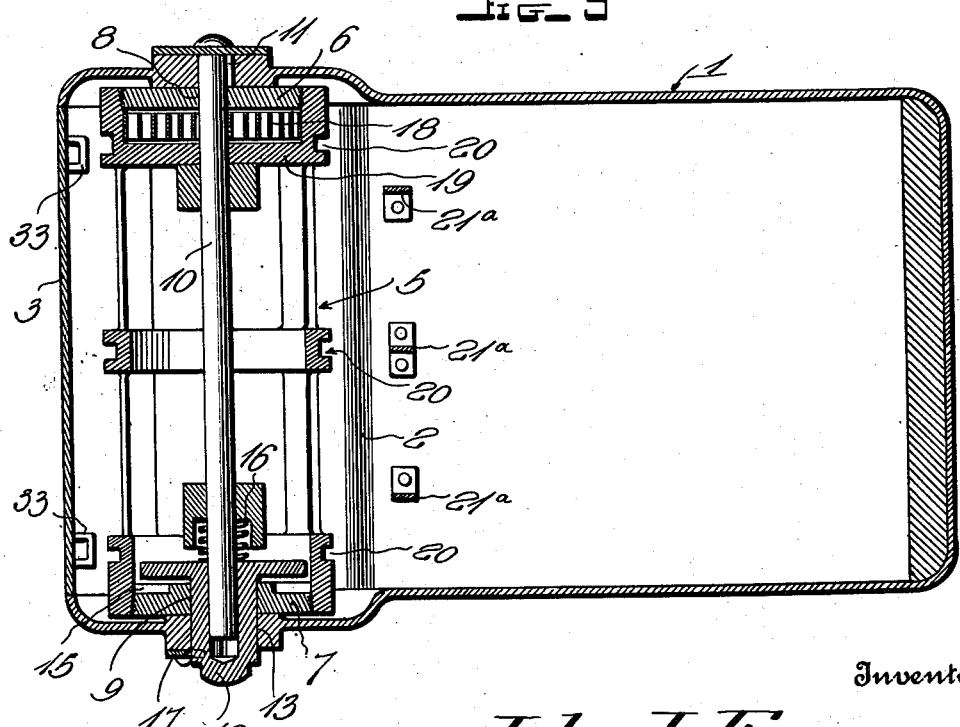

Figures 8 and 9 are vertical and horizontal sectional views as indicated by lines 8—8 and 9—9 of Figs. 7 and 6 respectively.

Figure 10 is a transverse sectional view as designated by line 10—10 of Fig. 6.

Figure 11 is a similar view showing a different position of parts.

Figure 12 is a detail longitudinal sectional view as indicated by line 12—12 of Fig. 11.

Figure 13 is a transverse sectional view on line 13—13 of Fig. 7.

Figure 14 is a view similar to Fig. 4, showing another form of construction.

Figure 15 is a vertical section of Fig. 14 on line 15—15 thereof.

In the drawings above briefly described, the numeral 1 designates a horizontally elongated chain casing adapted to be secured under the rear end of an automobile running board or otherwise suitably mounted adjacent one of the wheels, the rear end of said casing being preferably enlarged as seen at 2 and having a rearwardly swinging or slidably mounted door 3 through which the tire chain 4 is movable into and from the casing.

In the casing enlargement 2, a spring-wound drum 5 is mounted on a transverse horizontal axis so that its periphery is exposed when the door 3 is opened. As shown, the drum 5 is of openwork formation for lightness and inexpensive manufacture, said drum having end plates 6 and 7 which are preferably threaded in place, said end plates having central bearing openings 8 and 9 respectively. A fixed shaft 10 extends across the casing and through the openings 8 and 9, the end of said shaft adjacent the plate 6 being fixed to the casing as seen at 11, while the other end of said shaft is received in a sleeve 12 which is keyed thereon and slides through the opening 9 and a similar opening 13 in the casing 1. At its inner end sleeve 12 carries a flange having teeth 14 cooperable with ratchet teeth 15 on the inner face of plate 7 to hold the drum against immediate rewinding when the tire chain is removed, a spring 16 being provided to normally force the teeth into engagement. By means of a latch 17 however, the sleeve 12 may be locked in so that the teeth are held disengaged, permitting rewinding of the drum 5 under the action of its spring 18.

The spring 18 is of the spiral type and is confined between the end plate 6 and an adjacent plate 19 with which the drum is provided, one end of said spring acting on the drum and the other on the fixed shaft 10.

At suitable points, the periphery of the drum 5 is provided with circumferential grooves 20 which receive the rear ends of longitudinal tracks or rods 21 whose front ends are anchored to the casing. These rods are adapted to support the cross chains 4' of the tire chain 4, and the drum 5 is equipped with radially projecting carrier pins 22 to engage said cross chains and move them onto said rods as depicted in Fig. 4.

Preferably used in connection with the features above described, are two supplemental chains 29 connected at intervals by cross chains 30, said chains 29 being of a length to extend from the drum 5 to the automobile wheel as seen in Fig. 2. At one end the chains 29 are secured to a sliding bar 31 on the rods 21, while the other ends of said chains carry spring clips 32 for connection detachably with the side chains 4" for a purpose to appear below. Supports 21ª for the rear ends of the rods 21, act as stops for bar 31.

The operation of the device is as follows: Assuming that the chain 4 is applied to the wheel in the usual way and that the door 3 stands closed. The clips 32 are then engaged with keepers 33 on the door as seen in Fig. 1, the sliding bar 31 stands between the ends of the rods 21, the cross chains 30 rest on these rods, and the supplemental chains 29 extend over the drum 5. If the chain 4 is to be removed from the wheel and stored in the casing 1, the door 3 is opened, the clips 32 are removed from the keepers 33 and the chains 29 are pulled from the casing to the wheel of the machine, causing the cross chains 30 to engage the pins 22 and rotate the drum 5 to wind the spring 18, the teeth 14 and 15 co-acting to prevent rewinding of said drum. The usual fasteners of the side chains 4" are now released and the clips 32 are engaged with one end of said chains as seen in Fig. 2, while the other ends of said chains are hooked on brackets 40, secured to the wheel. This having been done, the sleeve 12 is pushed in and held by latch 17 so that the spring 18 will turn the drum 5 and move the chains 29 inwardly when the automobile wheel is rolled rearwardly off of the tire chain. The tire chain is thus drawn into the casing by the chains 29 until the pins 22 can engage the cross chains 4' and push them one at a time onto the rods 21. The free ends of the side chains 4" after detachment from the brackets 40, are hooked onto the keeper 33 so that the door 3 is pulled shut and yieldably held.

To apply the tire chain to the wheel, the door 3 is opened, the chain is withdrawn and temporarily engaged with the brackets 40 on the wheel (see Fig. 4). Rolling of this wheel will now pull the chain from the casing and position it around the tire, in which position it is held in the usual way. The clips 32 are then engaged with the keepers 33, the drum 4 is permitted to feed the chains 29 again into the casing, and the door 3 is closed.

In Figures 14 and 15, I have shown a different form of my invention, in which a relatively small casing 50 is partially built into the running board of the machine and extends partially below the same, the rear side of said casing having a hinged door 51 provided with a keeper 52 with which the end of the tire chain 53 is adapted to be engaged when said chain is confined in the casing. Within casing 50, is a spring wound drum 54 which is mounted in the same manner as the drum 5. The ends of this drum, however, are provided with flanges 55, and the radial pins 56 which are adapted to engage the cross chains of the tire chain 53, are connected at their outer ends by horizontal rods 57, forming arches with rounded corners which effectively guide the side chains of chain 53 into the space between the pins 56 and the flanges 55.

Brackets 58 which are preferably identical with the brackets 40, are secured to the automobile wheel adjacent the casing 50. When the chain 53 is to be applied, the door 51 is opened and the chain is disengaged from the keeper 52 and engaged with the brackets 58 so that rotation of the wheel will apply the chain to the wheel as said chain is withdrawn from the casing 50. During this withdrawal, the drum 54 is rotated against the tension of its winding spring 59 and the co-acting ratchet teeth 60 hold said drum against rewinding when the chain is totally removed therefrom. When the chain is to be again wound on the drum, one end of said chain is engaged with one of the arches 56—57, the teeth 60 are released and held in released position by a latch 61 operating in the same manner as the latch 17. It will thus be seen that the spring 59 will act to rotate the drum 54 and wind the chain 53 on said drum as rapidly as this chain is taken from the wheel, by moving the machine rearwardly. When the ends of the chain 53 are disengaged from the brackets or clips 58, they are hooked into the keeper 52 so that as the chain is completely wound on the drum, it will close the door 51 and retain this door in closed position until the chain is again needed.

From the foregoing, it will be seen that a very desirable device has to be provided for performing the required work and it is to be understood that within the scope of the invention as claimed, numerous changes may be made.

I claim:

1. A tire chain carrier comprising a casing adapted to be mounted on a vehicle, said casing having a door, and spring operated means in said casing to engage an ordinary tire chain and move it into the casing and exert a continual inward pull on the same, said door having means to which the end of the tire chain may be attached, whereby the pull of the chain on the door will hold said door closed.

2. A tire chain carrier comprising a casing adapted to be mounted on a vehicle, said casing having a door, and a spring-wound drum in said casing having means to engage an ordinary tire chain and move it into the casing, said door having means to which the free end of the chain may be connected to hold the door closed when the chain is within the casing.

3. A structure as specified in claim 2, the chain engaging means of said drum comprising radiating pins to contact with the usual cross chains.

4. A tire chain carrier comprising a casing adapted to be secured on a vehicle, said casing having a door opening, tire chain supporting means in said casing spaced from said door opening, and a rotatable drum in said casing between said door opening and said chain supporting means for feeding an ordinary tire chain onto said supporting means.

5. A tire chain carrier comprising a casing adapted to be secured on a vehicle, said casing having a door opening, tire chain supporting means in said casing spaced from said door opening, and a rotatable drum in said casing between said door opening and said chain supporting means for feeding an ordinary tire chain onto said supporting means, said drum having projecting pins at its periphery for engagement with the cross chains of the tire chain to effect the feeding operation.

6. A tire chain carrier comprising a casing adapted to be secured on a vehicle, said casing having a door opening, tire chain supporting means in said casing spaced from said door opening, a drum in said casing between said door opening and said chain supporting means, said drum having chain engaging means, a spring for rotating said drum to feed a tire chain into the casing onto said supporting means, said spring being wound by withdrawal of the chain from the casing, and releasable means for holding said drum when said spring is wound.

7. A tire chain carrier comprising a casing adapted to be secured on a vehicle, said casing having a door opening, tire chain supporting means in said casing spaced from said door opening, a spring-wound drum in said casing between said door opening and said chain supporting means, said drum having chain engaging means for feeding a tire chain into the casing onto said supporting means, a shaft on which said drum is mounted, said casing having an opening at one end of said shaft, a sleeve slidable on said shaft end and passing non-rotatably through said opening, and coacting teeth on said sleeve and said drum for releasably holding the latter against turning when its operating spring is wound.

8. A tire chain carrier comprising a casing adapted to be secured on a vehicle, said casing having a door opening, tire chain supporting means in said casing spaced from said door opening, a spring-wound drum in said casing between said door opening and said chain supporting means, said drum having chain engaging means for feeding a tire chain into the casing onto said supporting means, a shaft on which said drum is mounted, said casing having an opening at one end of said shaft, a sleeve slidable on said shaft end and passing non-rotatably through said opening, coacting teeth on said sleeve and drum for holding said drum against turning when its operating spring is wound, a spring for outwardly shifting said sleeve to interengage said teeth, and a latch for holding said sleeve in against the action of this spring when desired.

9. A tire chain carrier comprising a casing having a door opening, cross chain supporting means mounted horizontally in said casing and spaced from said opening, and a drum mounted in said casing between said supporting means and said opening, said drum having means for feeding a tire chain into the casing and laying its cross chains on said supporting means.

10. A tire chain carrier comprising a casing having a door opening, a plurality of spaced members mounted horizontally in said casing with one end spaced from said opening, and a drum mounted in said casing between said members and said opening and having means for feeding a tire chain into the casing and laying its cross chains across said members.

11. A structure as specified in claim 10, said drum having circumferential grooves receiving said one end of said members.

12. A tire chain carrier comprising a casing having a door provided on its inner side with a keeper, tire chain supporting means in said casing spaced from said door, and a spring-wound drum in said casing between said door and said supporting means, said drum having means for engagement with a tire chain to feed the same into the casing and onto said supporting means, the free end of said tire chain being adapted for attachment to said keeper for the purpose set forth.

13. A tire chain carrier comprising a casing having a door opening, tire chain supporting means in said casing spaced from said opening, a drum mounted in said casing between said opening and said supporting means, said drum having chain-engaging means for feeding a tire chain into the casing and onto said supporting means, supplemental chains confined in said casing and capable of being withdrawn therefrom over said drum, and means for attaching said supplemental chains detachably to a tire chain, said chain-engaging means of said drum being cooperable with said supplemental chains for the purpose set forth.

14. A structure as specified in claim 13, together with an outwardly swinging door for said door opening, a spring for turning said drum, and means for detachably connecting said supplemental chains to said door.

15. A structure as specified in claim 10, together with a sliding bar on said members and supplemental chains connected at one end to said bar and passing over said drum for the purpose set forth.

In testimony whereof I have hereunto set my hand.

JOHN J. EYRE.